United States Patent
Jain et al.

(10) Patent No.: US 10,169,098 B2
(45) Date of Patent: *Jan. 1, 2019

(54) DATA RELOCATION IN GLOBAL STORAGE CLOUD ENVIRONMENTS

(71) Applicant: INTERNATIONAL BUSINESS MACHINES CORPORATION, Armonk, NY (US)

(72) Inventors: Bhushan P. Jain, Jalgaon (IN); Sandeep R. Patil, Pune (IN); Sri Ramanathan, San Ramon, CA (US); Matthew B. Trevathan, Roswell, GA (US); Ujwala P. Tulshigiri, Santa Clara, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/836,156

(22) Filed: Dec. 8, 2017

(65) Prior Publication Data

US 2018/0101411 A1    Apr. 12, 2018

Related U.S. Application Data

(63) Continuation of application No. 13/309,640, filed on Dec. 2, 2011, now Pat. No. 9,916,184.

(51) Int. Cl.
*G06F 15/16*    (2006.01)
*G06F 9/50*    (2006.01)
*H04W 4/02*    (2018.01)

(52) U.S. Cl.
CPC ............ *G06F 9/5072* (2013.01); *H04W 4/02* (2013.01); *G06F 2209/502* (2013.01)

(58) Field of Classification Search
CPC ... G06F 9/5072; G06F 2209/502; H04W 4/02
USPC ..................................... 709/217, 218, 219
See application file for complete search history.

(56) References Cited

U.S. PATENT DOCUMENTS

| 5,559,707 A | * | 9/1996 | DeLorme | G01C 21/20 340/990 |
| 5,855,006 A | | 12/1998 | Huemoeller et al. | |
| 5,889,951 A | | 3/1999 | Lombardi | |
| 6,321,158 B1 | * | 11/2001 | DeLorme | G01C 21/26 340/995.16 |

(Continued)

OTHER PUBLICATIONS htipwatch.com, "The Surprising Effect of Distance on Download Speed", Aug. 14, 2008, 4 pages, http://blog.httpwatch.com/2008/08/14/th e-surprising-effect-of-distance-on-download-speed.

(Continued)

*Primary Examiner* — Thu Ha T Nguyen
(74) *Attorney, Agent, or Firm* — Christopher K. McLane; Andrew M. Calderon; Roberts Mlotkowski Safran Cole & Calderon, P.C.

(57) ABSTRACT

Methods and systems for data relocation in global storage cloud environments are provided. A method includes locating a data server near a travel location of a user based on one or more travel plans of the user. The method further includes transferring data of the user from a home data server near a home location of the user to the data server near the travel location.

20 Claims, 6 Drawing Sheets

(56) References Cited

U.S. PATENT DOCUMENTS

| | | | |
|---|---|---|---|
| 6,988,128 B1 | 1/2006 | Alexander et al. | |
| 7,143,170 B2 | 11/2006 | Swildens et al. | |
| 7,747,645 B2 | 6/2010 | Wahl | |
| 8,020,163 B2* | 9/2011 | Nollet | G06F 15/7825 |
| | | | 370/400 |
| 8,156,246 B2* | 4/2012 | Short | H04L 63/08 |
| | | | 709/239 |
| 8,301,701 B2* | 10/2012 | Goodman | H04L 12/581 |
| | | | 709/206 |
| 8,805,967 B2* | 8/2014 | Taylor | G06F 11/2005 |
| | | | 709/219 |
| 8,805,968 B2* | 8/2014 | Taylor | G06F 17/30132 |
| | | | 709/219 |
| 9,317,223 B2* | 4/2016 | Reohr | G06F 3/067 |
| 9,852,149 B1* | 12/2017 | Taylor | G06F 17/30194 |
| 2002/0178233 A1 | 11/2002 | Mastrianni et al. | |
| 2008/0082547 A1 | 4/2008 | Hwang et al. | |
| 2008/0307178 A1 | 12/2008 | Agombar et al. | |
| 2009/0077099 A1* | 3/2009 | Haustein | G06F 9/5011 |
| 2009/0276771 A1* | 11/2009 | Nickolov | G06F 9/4856 |
| | | | 717/177 |
| 2010/0076933 A1 | 3/2010 | Hamilton et al. | |
| 2011/0093554 A1 | 4/2011 | Shin | |
| 2011/0106278 A1 | 5/2011 | Martin-Cocher et al. | |
| 2011/0137974 A1 | 6/2011 | Momchilov | |
| 2012/0023223 A1 | 1/2012 | Branch et al. | |
| 2012/0102169 A1 | 4/2012 | Yu et al. | |
| 2012/0303654 A1 | 11/2012 | Ferris | |
| 2013/0073670 A1* | 3/2013 | Das | G06F 9/5027 |
| | | | 709/217 |
| 2014/0173232 A1* | 6/2014 | Reohr | G06F 3/0611 |
| | | | 711/162 |
| 2014/0239057 A1* | 8/2014 | Galvin, Jr. | H04M 1/72566 |
| | | | 235/375 |
| 2014/0242966 A1* | 8/2014 | Keating | H04W 48/04 |
| | | | 455/418 |
| 2015/0242927 A1* | 8/2015 | Will | G06Q 30/0629 |
| | | | 705/26.64 |
| 2015/0310188 A1* | 10/2015 | Ford | G06F 21/10 |
| | | | 726/28 |
| 2017/0116552 A1* | 4/2017 | Deodhar | G06Q 10/06316 |
| 2018/0025025 A1* | 1/2018 | Davis | G06F 17/30194 |
| | | | 707/827 |

OTHER PUBLICATIONS

Pemmaraju, "Storage-as-a-Service: Opportunities and Challenges", Leaders in the Cloud, May 19, 2010, 2 pages, http://www.sandhill.com/opinion/daily_blog .php?id= 71 &post=648.

Mell et al., "The NIST Definition of Cloud Computing", Oct. 7, 2009, 2 pages, Version 15.

* cited by examiner

DATA RELOCATION IN GLOBAL STORAGE CLOUD ENVIRONMENTS

TECHNICAL FIELD

The present invention generally relates to cloud computing, and more particularly, to methods and systems for data relocation in global storage cloud environments.

BACKGROUND

Information technology is changing rapidly and now forms an invisible layer that increasingly touches nearly every aspect of business and social life. An emerging computer model known as cloud computing addresses the explosive growth of Internet-connected devices, and complements the increasing presence of technology in today's world. Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

Cloud computing is massively scalable, provides a superior user experience, and is characterized by new, Internet-driven economics. In one perspective, cloud computing involves storage and execution of business data inside a cloud which is a mesh of inter-connected data centers, computing units and storage systems spread across geographies.

More specifically, with the advent of cloud computing, concepts such as storage clouds have emerged. The storage clouds are a network of storage which can be shared by users without the need for them to manage the storage infrastructure. A storage cloud provider typically caters to the users from all over the globe, and the storage infrastructure may be spread across geographies to serve the users in their local regions. Thus, the storage cloud provider may place data storage centers in different geographical locations.

When a user requests his or her data from a storage cloud for a computing device (e.g., a mobile device), the request has to pass through a number of routers, networks, and/or other processing elements in a data path. Due to this routing process, it takes longer to serve the data to the user as the distance between the user and a physical location of the data increases. Thus, when the user changes his or her location (e.g., from his or her home location to an intermediate or final travel location), data transfer speed also varies. If the user constantly needs to travel away from the home location, the user may have to suffer from slower data transfer rates due to delayed responses over the network. Further, the user may be transferring unnecessary data from the home location to a new travel location since all of the data in the storage cloud may not be required by the user at a time.

SUMMARY

In a first aspect of the invention, a method includes locating a data server near a travel location of a user based on one or more travel plans of the user. The method further includes transferring data of the user from a home data server near a home location of the user to the data server near the travel location.

In another aspect of the invention, a system implemented in hardware, includes a computer infrastructure operable to determine one or more user-defined policies of data of a user, each of the one or more user-defined policies indicating a relevance of the user data for use at a travel location of the user. The computer infrastructure is further operable to selectively transfer the user data from a home data server near a home location of the user to a data server near the travel location based on the one or more user-defined policies.

In an additional aspect of the invention, a computer program product includes a computer usable storage medium having readable program code embodied in the storage medium, the computer program product includes at least one component operable to determine one or more user-defined policies of data of a user, each of the one or more user-defined policies indicating a relevance of the user data for use at a travel location of the user. The at least one component is further operable to locate a data server near the travel location based on one or more travel plans of the user, and selectively transfer the user data from a home data server near a home location of the user to the data server near the travel location based on the one or more user-defined policies.

In a further aspect of the invention, a method of data relocation in global storage cloud environments, includes providing a computer infrastructure, being operable to receive one or more travel plans of a user from at least one of a user calendar and one or more travel planner tools. The computer infrastructure is further operable to locate a data server near an intermediate travel location of the user based on the one or more travel plans, and transfer data of the user from a home data server near a home location of the user to the data server near the intermediate travel location.

In another aspect of the invention, a computer system for data relocation in global storage cloud environments, includes a CPU, a computer readable memory and a computer readable storage media. First program instructions receive one or more travel plans of a user from at least one of a user calendar and one or more travel planner tools. Second program instructions receive one or more user-defined policies of data of the user from a policy database, each of the user-defined policies indicating a relevance of the user data for use at a travel location of the user.

Third program instructions locate a data server near the travel location based on the one or more travel plans. Fourth program instructions selectively transfer the user data from a home data server near a home location of the user to a data server near the travel location based on the one or more user-defined policies. The first, second, third, and fourth program instructions are stored on the computer readable storage media for execution by the CPU via the computer readable memory.

BRIEF DESCRIPTION OF THE SEVERAL VIEWS OF THE DRAWINGS

The present invention is described in the detailed description which follows, in reference to the noted plurality of drawings by way of non-limiting examples of exemplary embodiments of the present invention.

DETAILED DESCRIPTION

Figure 1:
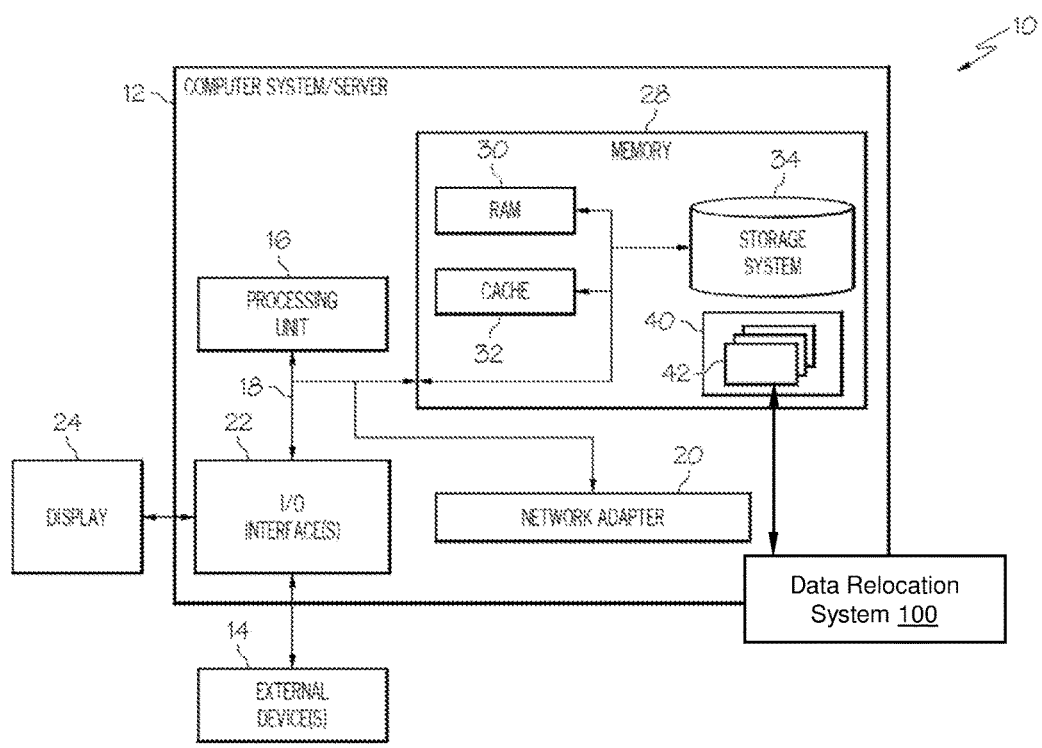
FIG. 1 depicts a cloud computing node according to an embodiment of the present invention.

The present invention generally relates to cloud computing, and more particularly, to methods and systems for data relocation in global storage cloud environments. More specifically, the present invention includes a data relocation system which can transfer (e.g., migrate or replicate) user data stored in a home data center near a home or office location (i.e., an initial location) of a user to a data center near or nearest to a new location of the user. In embodiments, the data relocation system may determine the data center near or nearest to the new location based on a user's travel plan or itinerary stored in a user's calendar and/or other travel planner tools, e.g., online travel web sites. Advantageously, the user may access the user data at high transfer speeds irrespective of the distance between a location of the home data center and the user's new location, in a cloud computing environment.

Further, the data relocation system can customize or filter the user data to be transferred based on policies defined by the user. For example, via the policies, the user may inform the data relocation system of files of the user data that are relevant and/or required for use while the user is traveling to and/or at the new location. Accordingly, the data relocation system may transfer from the home data center to the new data center only the relevant and/or required files. Accordingly, only necessary bandwidth between data centers in the cloud computing environment is utilized, and data transfer speeds in the cloud computing environment are further reduced.

Cloud Computing

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

For convenience, the Detailed Description includes the following definitions which have been derived from the "Draft NIST Working Definition of Cloud Computing" by Peter Mell and Tim Grance, dated Oct. 7, 2009. Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth herein.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device, but may also be a special purpose computing device using programmable code to make the computer system/server 12 to perform the functions herein. The components of computer system/server 12 may include, but are not limited to, one or more processors or processing units 16, a system memory 28, and a bus 18 that couples various system components including system memory 28 to processor 16. In embodiments, the computer system/server 12 comprises or communicates with a data relocation system 100.

In embodiments, a user, along with a device of the user, can travel from a home location (e.g., a user's home or office) to a new (current or future) location (e.g., a travel destination). At this new location, the user device may be farther in distance from a data center or server near the home location (e.g., a home data center), and may be closer to another data center or server near the new location (e.g., a destination data center). Thus, the user would experience slower data access speeds when accessing the user data from the home data center, and would experience faster data access speeds when accessing the user data from the destination data center. Accordingly, before or when the user travels from the home location to the new location, the data relocation system 100 may determine or locate a data center of a cloud computing environment that is nearer or nearest to the new location (e.g., the destination data center) for data access, to maintain fast data access rates.

In accordance with further aspects of the present invention, the data relocation system 100 can determine the data center near or nearest to the user's new (final or intermediate) location by receiving a user's travel plans from, e.g., a user's calendar, and determining the near or nearest data center based on the received travel plans. For example, when a travel plan entry of the user's calendar indicates that the user is traveling to location #1, the data relocation system 100 may determine a data center located in the vicinity of location #1, e.g., the destination data center. If the travel plan entry indicates that the user has to wait in location #2 (e.g., an intermediate location) for several hours before the next flight to location #1, then the data relocation system 100 may determine a data center located near location #2.

In embodiments, the data relocation system 100 is configured to transfer the user data to the data center near or nearest the user's new location based on the user's travel plans and user-defined policies. This allows for the user data to be transferred or replicated to the data center, and/or to a new data center or server at another location near or nearest to the user. This, in turn, provides fast data access speeds at the user's new location. The data relocation system 100 may further allow the user to customize the data to be relocated based on user-defined data requirements or policies for locations, including a new location corresponding to a user's travel itinerary. To determine such travel locations, the data relocation system 100 may use the user's calendar so that the required data may be automatically transferred in advance. The data relocation system 100 may further use online travel planner tools (e.g., travel web sites) to determine the travel locations and/or intermediate travel locations (e.g., locations the user travels to or lays over at before a final destination), of a user's travels, and to transfer the required data to data centers near these travel locations.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein, e.g., provide control, function, and operability of the data relocation system 100. For example, the program modules 42 provide control, function, and operability so that the data relocation system 100 can locate a data center or server nearest to a new (current or future) location of a user, and transfer a user's data to such data center. The data relocation system 100 may further allow the user to select the data to be relocated based on user-defined policies for each file of the data. These policies may include data transfer, data replication, types of data to transfer, access to such data, etc. To determine these travel locations, the data relocation system 100 may utilize a user calendar so that the selected data may be automatically transferred in advance or when the user travels to one of the locations. The data relocation system 100 may further utilize online travel planner tools (e.g., travel web sites) to determine the travel locations and/or intermediate travel locations (e.g., locations the user travels to or lays over at before a final destination), of a user's travels. Once the travel locations and/or the intermediate travel locations are determined, the data relocation system 100 may migrate or replicate the selected data to data centers near such travel locations.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

As will be appreciated by one skilled in the art, aspects of the present invention, including the data relocation system 100 and the functionality provided therein, may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Figure 2:
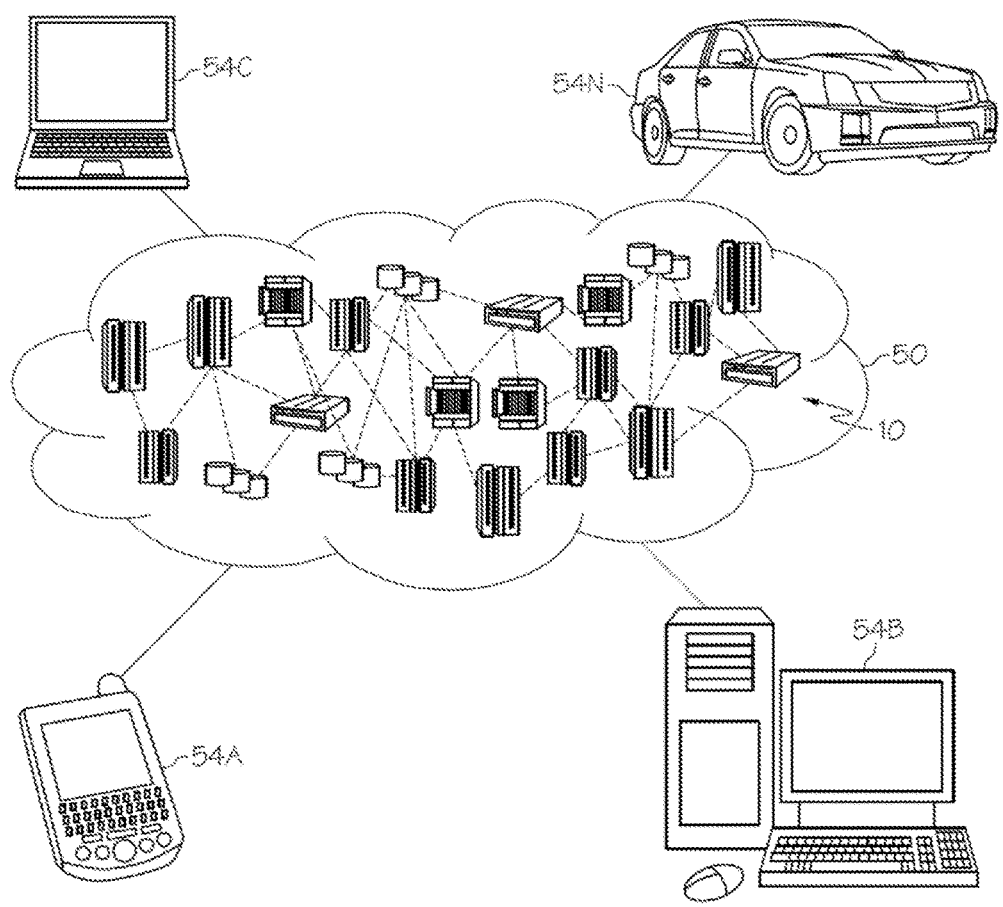
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
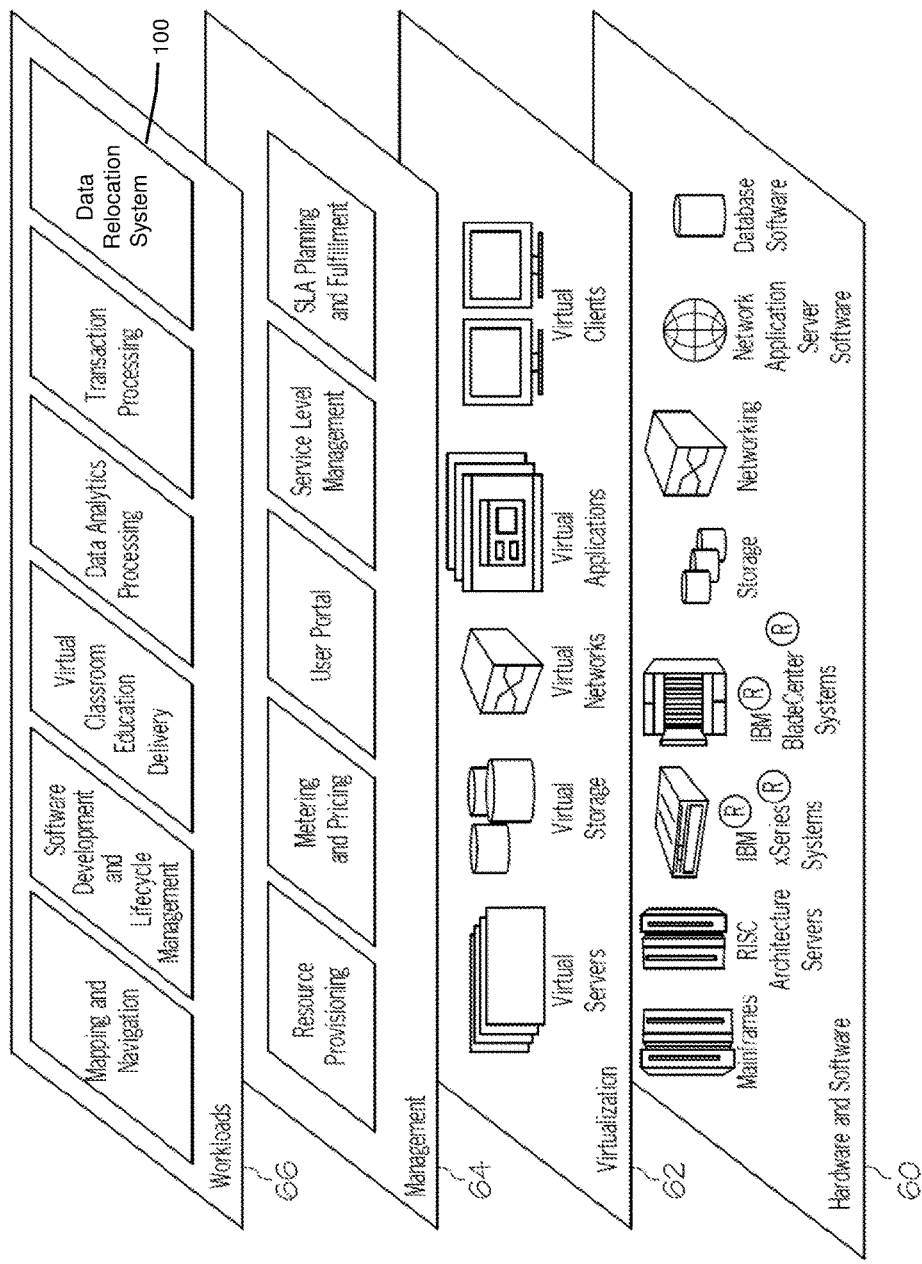
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide.)

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and the data relocation system 100. More specifically, the data relocation system 100 can migrate or replicate user data stored in a remotely-located home data center to a data center nearest to a new (current or future) location of a user based on a user's travel itinerary. Advantageously, by making such transfer or replication of the user data, the user may access the user data at high transfer speeds irrespective of the distance between a location of the home data center and the user's new location. For example, the user data may be transferred in advance based on the user's future travel itinerary stored in a user's calendar and/or other travel planner tools, e.g., online travel web sites. Further, the data relocation system 100 may customize or filter the user data to be transferred based on policies defined by the user.

In embodiments, the data relocation system 100 can automatically migrate or replicate data of a user from a data center or server near a user's home location to a data center physically located near a user's new location based on a user's travel itinerary from, e.g., a user's calendar. At the new data center, the user may access the user data in the cloud through a computing device, e.g., a mobile device, such as a cell phone and/or other portable devices. The data relocation system 100 may further selectively migrate or replicate the user data based on relevance of the data and/or policies defined by the user. In addition, the data relocation system 100 may locate a user's intermediate travel locations (e.g., locations the user travels prior to reaching a final destination) during a user's travels using online travel planner tools (e.g., travel web sites), and may migrate or replicate the user data to data centers near these intermediate travel locations.

Figure 4:
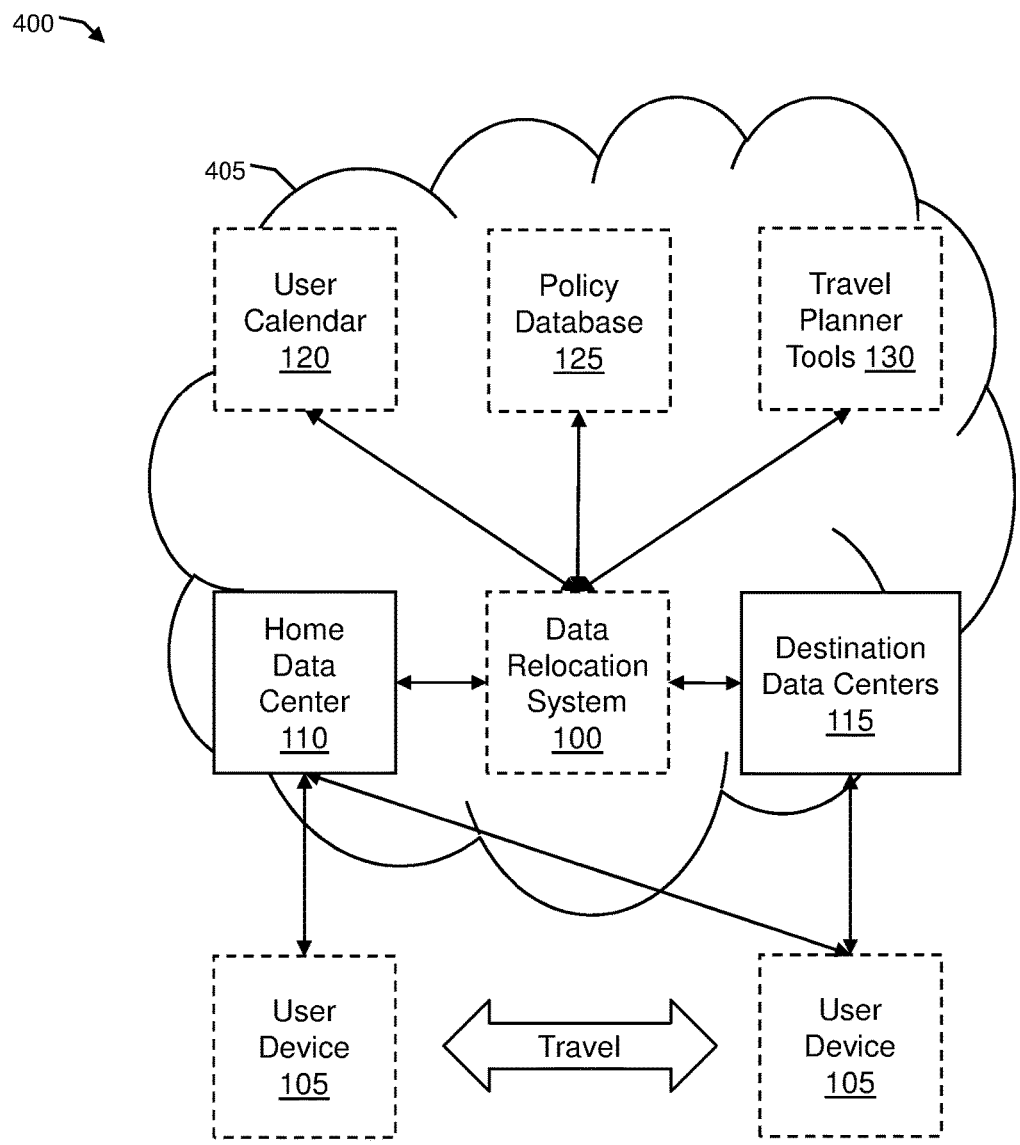
FIG. 4 depicts an illustrative environment according to an embodiment of the present invention.

FIG. 4 depicts an illustrative environment 400 according to an embodiment of the present invention. In embodiments, the environment 400 can include at least one user device 105 and a cloud computing environment 405. The user device 105 may include any type of computing device, such as the personal digital assistant (PDA) or cellular telephone 54A, the desktop computer 54B, the laptop computer 54C, and/or the automobile computer system 54N, in FIG. 2. The cloud computing environment 405 may include the data relocation system 100, a home data center 110, one or more destination data centers 115, a user calendar 120, a policy database 125, and one or more travel planner tools 130 (e.g., travel web sites), each of which may be implemented in the computer system/server 12 of FIG. 1, for example.

Initially, the user device 105 can be at a home location, e.g., an office, a home, or other location near the office or the home. A user, via the user device 105, may purchase storage capacity for data of the user from a cloud (e.g., the cloud computing environment 405) which offers storage services. For example, upon purchase or other arrangements, the user data may be transferred from the user device 105 and stored at the home data center 110, which is proximate the home location of the user device 105. The data relocation system 100 may map the user device 105 to the home data center 110 storing the user data. Since the home data center 110 is near to the user device 105, the user may obtain high performance in terms of data access and transfer rates.

In accordance with further aspects of the present invention, the user, via the user device 105 and/or nodes in the cloud computing environment 405 (e.g., the home data center 110), can set or enter one or more travel plans or itineraries of the user in the user calendar 120 and/or the travel planner tools 130. In embodiments, the user calendar 120 and/or the travel planner tools 130 may be implemented in the computer system/server 12 of FIG. 1, and/or in the user device 105 as, e.g., a client installed in the user device 105. The travel plans may include one or more final travel locations (e.g., countries, cities, and/or other destination locations), one or more intermediate travel locations (e.g., temporary locations the user travels prior to reaching a final destination, stopovers, layovers, etc.), and/or one or more travel times (e.g., flight departure, layover, and/or arrival times). The travel plans may be stored in a database (e.g., the storage system 34) of the user calendar 120 and/or the travel planner tools 130.

In embodiments, the user, via the user device 105 and/or the nodes in the cloud computing environment 405, can set or enter one or more policies in the policy database 125. The policy database 125 may be implemented in the computer system/server 12 of FIG. 1, and/or in the user device 105 as, e.g., a client installed in the user device 105. The policies, for example, may categorize user files based on many different requirements including, e.g., security concerns, required information, costs for data transfer, etc. For example, if the user is traveling to a foreign country, then during this time, the user may request data migration related to a user's business clients in the foreign country and selected personal information, e.g., a user's telephone number and/or a street address. In this case, the user will create a policy requesting the data relocation system 100 to transfer the user data the user may need during travel to the foreign country. Based on the created policy, the data relocation system 100 may transfer only these types of the user data from a data center in the original location. (e.g., the home data center 110) to a data center at the final destination (e.g., the destination data centers 115) during travel to the final destination.

More specifically, in embodiments, each of the user-defined policies can inform the data relocation system 100 of (i) an owner of a file of the user data, (ii) a class of the file, and (iii) one or more travel locations where the file may be relevant and/or used during travel. The owner of the file may include a user identifier (ID) associated with the file. The class of the file may include a classification of the file based on one or more characteristics (e.g., confidentiality, personal, etc.) of the file that may be found in semantic content, metadata, and/or attributes of the file. Based on the travel locations and policies, the data relocation system 100 will automatically transfer certain files to certain travel locations which match a new user location.

In accordance with further aspects of the invention, each of the user-defined policies can further inform the data relocation system 100 of one or more blacklist locations where the file cannot be accessed or transferred due to, e.g., security issues at the blacklist locations. In embodiments, each of the user-defined policies may further include a transfer time of the file that indicates when the file is to be transferred (e.g., in 48 hours), and an indication of whether the file is to be migrated and/or replicated to the data center at the user's new location. For example, if a new location of the file is overseas, then the user-defined policy may indicate that the file is to be only replicated to the new location thereby avoiding migration of a file back to a home location.

In embodiments, all of the user-defined policies can be stored in the policy database 125 and/or a central database (e.g., the storage system 34) of at least one component in the cloud computing environment 405 (e.g., the data relocation system 100, the user device 105, etc.). Each of the policies may include the following database schema, namely, information (fields) and types of information:

| | | | | Field: | | |
|---|---|---|---|---|---|---|
| | | Owner | Class | Locations | Blacklist Locations | Transfer Time | Migrate and/or Replicate |
| Type: Description: | | String User ID associated with file | String Class of file based on file contents or metadata | String Comma-separated list of locations for which file is relevant and/or required | String Comma-separated list of locations for which file cannot be accessed | String Time which file is to be transferred | String Indication whether file is to be migrated and/or replicated |

In accordance with further aspects of the present invention, the user-defined policies can be indexed and/or sorted in the policy database 125 based on the owner and/or the class, of each of the policies. Thus, to access or receive one of the policies, the data relocation system 100 may send a primary key including an owner and/or a class of a desired policy to the policy database 125.

In embodiments, the user, along with the user device 105, can travel from the home location to a new (current or future) location. Alternatively, or additionally, the user may travel from the home location to the new location and use another computing device at the new location. At this new location, the user device 105 (or the another computing device) may be farther in distance from the home data center 110, and may be closer to the destination data centers 115. Thus, the user would experience slower data access speeds when accessing the user data from the home data center 110, and would experience faster data access speeds when accessing the user data from the destination data centers 115. Accordingly, before or when the user device 105 travels from the home location to the new location, the data relocation system 100 may determine or locate a data center of the cloud computing environment 405 that is nearer or nearest to the new location (e.g., the destination data centers 115) for data access, to maintain fast data access rates.

In accordance with further aspects of the present invention, the data relocation system 100 may determine the data center near or nearest to the user's new (final or intermediate) location by receiving the user's travel plans from the user calendar 120 and/or the travel planner tools 130, and determining the near or nearest data center based on the received travel plans. For example, when a travel plan entry of the user calendar 120 indicates that the user is traveling to location #1, the data relocation system 100 may determine a data center located in the vicinity of location #1, e.g., the destination data centers 115. If the travel plan entry indicates that the user has to wait in location #2 (e.g., an intermediate location) for several hours before the next flight to location #1, then the home data center 110 may determine a data center located near location #2. In embodiments, the data relocation system 100 may determine the data center near or nearest the user's new or intermediate location based on the user's travel plans before and/or after the user has traveled to the new or intermediate location.

In embodiments, once the data center near or nearest to the user's new or intermediate location (e.g., the destination data centers 115) is determined, the data relocation system 100 can migrate or replicate the relevant and/or required user data from the home data center 110 to the destination data centers 115 based on the user-defined policies received from the policy database 125. For example, the data relocation system 100 may migrate or replicate only certain files of the user data that are deemed relevant and/or required for use at the user's new location by the user-defined policies. The data relocation system 100 may transfer the relevant user data to the destination data centers 115 before (e.g., in advance of) or after the user travels from the home location to the new location. Advantageously, during the user's stay at the new location (e.g., near the destination data centers 115), the user can access files of the user data without significant delay in response. That is, the impact of long distances on data transfer speeds during user's travel is minimized, and the amount of data transferred is also minimized through the use of the user-defined policies.

In accordance with further aspects of the present invention, the data relocation system 100 can fetch at least one file from the user data stored in the home data center 110, if the file is required by the user for use at the new (current or future) location but is not present in the migrated files from the home data center 110. More specifically, the data relocation system 100 may determine whether the file required by the user at the new location is present in the migrated files. If not, the required file is fetched from the home data center 110 and allowed to be accessed by the user at the new or intermediate location. If the required file is present in the migrated files, then there is no need for a fetch of the required file from the home data center 110, and the required file is allowed to be accessed by the user.

In embodiments, after the relevant files are accessed by the user at the new or intermediate location, the data relocation system 100 can migrate or replicate the relevant files from the destination data centers 115 back to the home data center 110. Thus, the home data center 110 may be synchronized with the destination data centers 115 in terms of files stored on their respective storage capacities. Alternatively, the data relocation system 100 may reset the files stored on their respective storage capacities to their initial state.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowcharts and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowcharts and/or block diagram block or blocks.

Figure 5:
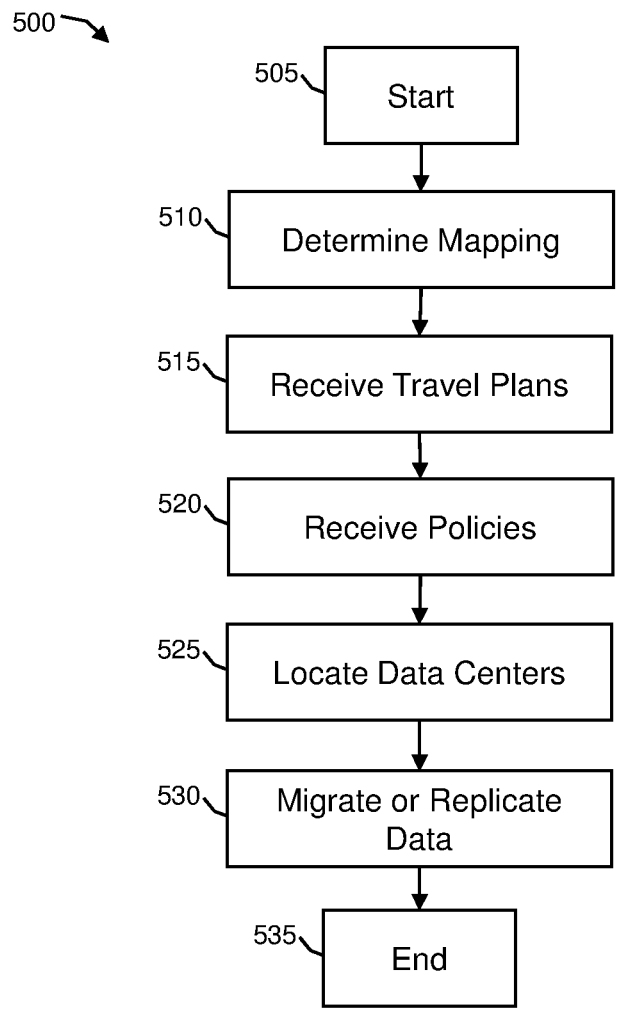
FIGS. 5-6 depict exemplary flow diagrams according to embodiments of the present invention.
Figure 6:
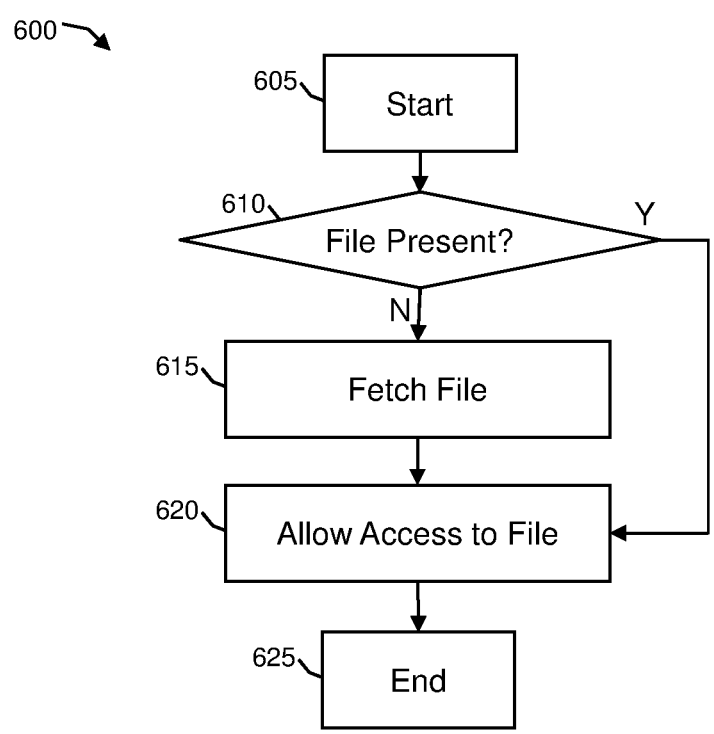

FIGS. 5-6 show exemplary flows for performing aspects of the present invention. The steps of FIGS. 5-6 may be implemented in the environments of FIGS. 1-4, for example.

The flowcharts and block diagrams in the Figures illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

Furthermore, the invention can take the form of a computer program product accessible from a computer-usable or computer-readable medium providing program code for use by or in connection with a computer or any instruction execution system. The software and/or computer program product can be implemented in the environments of FIGS. 1-4. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disc-read/write (CD-R/W) and DVD.

FIG. 5 depicts an exemplary flow for a process 500 in accordance with aspects of the present invention. In embodiments, the process 500 can be performed by the data relocation system 100 in FIGS. 1 and 3-4. At step 505, the process starts. At step 510, the data relocation system determines a mapping between a user device using data storage capacity of a cloud (e.g., the cloud computing environment 405 in FIG. 4) and a home data center (e.g., the home data center 110) storing data of the user.

At step 515, the data relocation system receives one or more travel plans or itineraries of the user from a user calendar (e.g., the user calendar 120 in FIG. 4) and/or one or more travel planner tools (e.g., the travel planner tools 130). In embodiments, the travel plans can include one or more final travel locations (e.g., countries, cities, and/or other destination locations), one or more intermediate travel locations (e.g., temporary locations the user travels prior to reaching a final destination, stopovers, layovers, etc.), and/or one or more travel times (e.g., flight departure, layover, and/or arrival times). At step 520, the data relocation system receives one or more policies of the user data from a policy database (e.g., the policy database 125). Each of the policies may be user-defined and may inform the data relocation system of, e.g., an owner of a file of the user data, a class of the file, and one or more travel locations where the file may be relevant and/or required for use during travel.

At step 525, before or when the user from a home location near the home data center to a new location, the data relocation system locates a data center of the cloud that is nearer or nearest to the new location (e.g., the destination data centers 115 in FIG. 4) for data access, to maintain fast data access rates. In embodiments, the data relocation system can determine the data center near or nearest to the user's new (final or intermediate) location based on the user's travel plans received from the user calendar and/or the travel planner tools. At step 530, the data relocation system migrates or replicates the relevant and/or required user data from the home data center to the destination data center based on the user-defined policies received from the policy database. For example, the data relocation system may migrate or replicate only certain files of the user data that are deemed relevant and/or required for use at the user's new location by the user-defined policies. At step 535, the process ends.

FIG. 6 depicts an exemplary flow for a process 600 in accordance with aspects of the present invention. In embodiments, the process 600 can be performed by the data relocation system 100 in FIGS. 1 and 3-4, to fetch at least one file from user data stored in a home data center, if the file is required by a user for use at the new (current or future) location but is not present in files transferred from the home data center to a data center at the new location. At step 605, the process starts. At step 610, the data relocation system determines whether the file required by the user at the new location is present in the transferred files. If not, the process continues at step 615. Otherwise, the process continues at step 620.

At step 615, the data relocation system fetches the required file from the home data center. At step 620, the data relocation system allows access to the required file by the user at the new or intermediate location. At step 625, the process ends.

In embodiments, a service provider, such as a Solution Integrator, could offer to perform the processes described herein. In this case, the service provider can create, maintain, deploy, support, etc., the computer infrastructure that performs the process steps of the invention for one or more customers. These customers may be, for example, any business that uses technology and provides or utilizes services. In return, the service provider can receive payment from the customer(s) under a subscription and/or fee agreement and/or the service provider can receive payment from the sale of advertising content to one or more third parties.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein. Many modifications and variations will be apparent to those of ordinary skill in the art without departing from the scope and spirit of the invention. The corresponding structures, materials, acts, and equivalents of all means or step plus function elements in the claims, if applicable, are intended to include any structure, material, or act for performing the function in combination with other claimed elements as specifically claimed. Accordingly, while the invention has been described in terms of embodiments, those of skill in the art will recognize that the invention can be practiced with modifications and in the spirit and scope of the appended claims.

What is claimed is:

1. A method of data relocation in global storage cloud environments, comprising:
   providing a computer system, being operable to:
   mapping a user device to a home data server to store data of a user;
   locating a data server near a travel location of the user based on one or more travel plans of the user, the one or more travel plans include one or more final travel locations and one or more intermediate travel locations including temporary locations the user travels prior to reaching the one or more final travel locations including a stopover or a layover;
   locating the one or more intermediate travel locations during a user's travels using online travel web sites;
   indexing and sorting one or more user-defined policies based on an owner and class of each policy of the one or more policies;
   accessing the one or more user-defined policies by a primary key which includes an owner and a class of a desired policy out of the one or more user-defined policies;
   filtering data from the stored data based on the one or more user-defined policies to determine which stored data is to be transferred; and
   transferring the filtered data from the home data server near a home location of the user to the data server near the travel location.

2. The method of claim 1, wherein the data server is a nearest data server to the travel location.

3. The method of claim 1, wherein the travel location is one of the one or more final travel locations and the one or more intermediate travel locations, of the user during travel.

4. The method of claim 1, further comprising receiving the one or more travel plans from at least one of a user calendar and one or more travel planner tools.

5. The method of claim 4, wherein the user sets the one or more travel plans in at least one of the user calendar and the one or more travel planner tools.

6. The method of claim 1, wherein the transferring of the filtered data further comprises at least one of migrating and replicating the filtered data from the home data server to the data server near the travel location.

7. The method of claim 1, wherein the transferring of the filtered data is performed one of before and after the user travels to the travel location.

8. The method of claim 1, wherein the user-defined policies additionally comprise at least one of:
one or more travel locations where the file may be relevant for use;
one or more blacklist locations where the digital data file cannot be transferred;
costs for data transfer;
a transfer time of the digital data file; and
an indication of whether the digital data file is to be at least one of migrated and replicated from the home data server to the data server near the travel location.

9. The method of claim 1, further comprising fetching data from the home data server when the data is required by the user for use at the travel location but is unavailable from the transferred data.

10. The method of claim 1, further comprising transferring the transferred data from the data server near the travel location back to the home data server after the user accesses the transferred data.

11. The method of claim 1, further comprising migrating the data of the user from the home data server to the data server near the travel location so that certain data of the user can only be replicated at the data server near the travel location while avoiding migration of the certain data of the user back to the home data server.

12. A system for data relocation in global storage cloud environments, the system comprising:
a computer system operable to:
map a device of a user to a home data server to store user digital data files;
receive one or more travel plans of a user from one or more online travel planner tools including online travel web sites, the travel plans including one or more final travel locations and one or more intermediate travel locations including temporary locations the user travels prior to reaching the one or more final travel locations including a stopover or a layover, and one or more travel times including flight departure, layover, and arrival times;
receive one or more user-defined policies of the user digital data files from a policy database, each of the user-defined policies indicating a relevance of each of the user digital data files for use at a travel location of the user;
categorize the user digital data files based on the one or more user-defined policies;
locate the travel location during a user's travels using the online travel web sites;
locate a data server near the travel location of the user based on the one or more travel plans;
transfer the user digital data files from the home data server to the data server near the travel location based on the one or more user-defined policies of each of the user digital data files;
determine whether a user digital data file required by the user is present in the transferred user digital data files; and
fetch and migrate the required user digital data file not present in the migrated user digital data files from the home data server to the data server near the travel location.

13. The system of claim 12, wherein the data server is a nearest data server to the travel location.

14. The system of claim 12, wherein the transferring of the user digital data files further comprises at least one of migrating and replicating the user digital data files from the home data server to the data server near the travel location.

15. The system of claim 12, wherein the travel location is one of the one or more final travel location and the one or more intermediate travel locations, of the user during travel.

16. The system of claim 12, wherein the user-defined policies comprise:
one or more travel locations where the file may be relevant for use;
one or more blacklist locations where the digital data file cannot be transferred;
costs for data transfer;
a transfer time of the digital data file; and
an indication of whether the digital data file is to be at least one of migrated and replicated from the home data server to the data server near the travel location.

17. The system of claim 16, wherein the user-defined policies further comprise:
a key which includes an owner and a class associated with the user digital data files;
a comma separated list of locations for which the user digital data files are relevant and required; and
a comma separated list of locations for which the user digital data files cannot be accessed.

18. A computer program product comprising a tangible computer usable storage medium having readable program code embodied in the tangible computer usable storage medium, the computer program product includes at least one component operable to:
determine one or more user-defined policies of data of a user, each of the one or more user-defined policies indicating a relevance of the user data for use at a travel location of the user and include (i) an owner of a digital data file including a user identifier (ID) associated with the file, (ii) a class of a digital data file based on file contents comprising confidentiality, semantic content and metadata, and (iii) one or more travel locations where a digital data file may be relevant or used during travel;
locate the travel location during a user's travels by utilizing an online travel web site;
locate a data server near the travel location based on one or more travel plans of the user received from one or more online travel planner tools, the travel plans including one or more final travel locations and one or more intermediate travel locations including temporary locations the user travels prior to reaching the one or more final travel locations including a stopover or a layover, and one or more travel times including flight departure, layover, and arrival times, the one or more final travel locations and the one or more intermediate travel locations being stored in the online travel web site; and
transfer the user data from a home data server near a home location of the user to the data server near the travel location based on the one or more user-defined policies.

19. The computer program product of claim 18, wherein the at least one component is further operable to receive the one or more travel plans from a user calendar.

20. The computer program product of claim 18, wherein the at least one component is further operable to map a user device of the user to the home data server to store the user digital data files.

* * * * *